No. 724,572. PATENTED APR. 7, 1903.
B. J. HALL.
THERMO-ELECTRIC BATTERY.
APPLICATION FILED JULY 16, 1902.
NO MODEL.
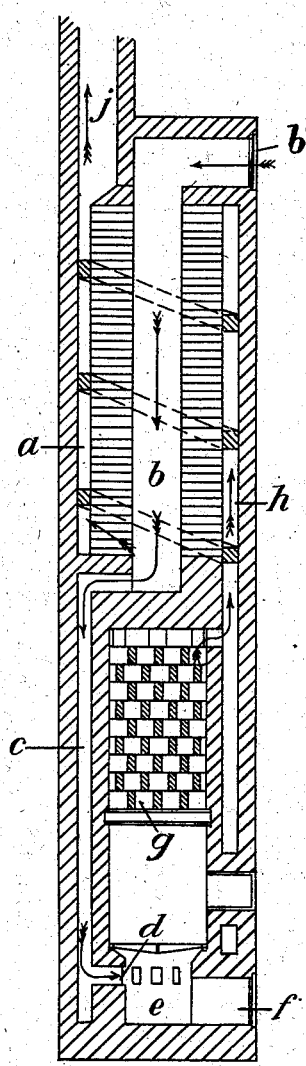
Witnesses
Inventor
Benjamin J. Hall,
By Wm E Coulter
Attorney

UNITED STATES PATENT OFFICE.

BENJAMIN JAMES HALL, OF BARNES, ENGLAND.

THERMO-ELECTRIC BATTERY.

SPECIFICATION forming part of Letters Patent No. 724,572, dated April 7, 1903.

Application filed July 16, 1902. Serial No. 115,777. (No model.)

*To all whom it may concern:*

Be it known that I, BENJAMIN JAMES HALL, engineer, a subject of the King of Great Britain, residing at 41 Castelnau, Barnes, in the county of Surrey, England, have invented certain new and useful Improvements in or Connected with Thermo-Electric Batteries, of which the following is a specification.

This invention relates to batteries of the type known as "thermo-electric," wherein electric currents are generated by heating alternate junctions of bars of suitable metals, the intervening junctions being maintained at a lower temperature.

The improvement consists in so arranging the parts in conjunction with a suitable furnace, heat-reservoir, or source of heat as to form a cold-air-inlet channel on one side of the heat-supply and a hot-air-outlet channel on the other side.

The junctions of the metallic pairs which require to be kept cool project into or are in close proximity to the cold-air channel. The junctions of the metallic pairs which require to be kept hot project into or are in close proximity to the hot-air channel. The furnace is so arranged that the air necessary for combustion must be drawn in through the cold-air channel, and the products of combustion passing through the hot-air channel are led away, so that they do not mix with the incoming draft.

In order to extract the greatest quantity of heat from the furnace-gases, I construct the walls or wall of the passages opposite the metallic junctions to be heated in such a manner that they shall be approximately non-conducting where exposed to the atmosphere, but capable of absorbing and radiating heat on the side or sides exposed to the heated gases from the furnace, and to produce a uniform distribution of the heat from the gases I provide where necessary a checker-work of some suitable material, such as firebrick, forming a heat-regenerative chamber through which the gases are compelled to pass. The cold-air passages may be provided with a similar checker-work regenerative chamber where needful. The passages may be of any shape and arranged in any convenient manner, the object being to bring cold air into contact with the junctions to be cooled. This air carries back through the furnace heat from the metallic junctions which need to be kept cool to the metallic junctions which need to be kept hot. A forced draft may be used in cases where combustion is not sufficiently rapid or where the passages oppose too much resistance to the air-currents.

Instead of a special furnace as described hot air generated by furnaces used for other processes can be utilized in the apparatus, or the apparatus may be used to convert into electric energy the heat wasted in cooling masses of metal, slag, and the like.

In the accompanying drawing I have shown by way of illustration, in sectional elevation, apparatus suitable for carrying out my invention.

$a$ designates the thermocouples; $b$, the air-inlet channel controlled by a valve $b'$; $c$, the flue leading the air to the under side of grate $d$; $e$, an ash-pit; $f$, the air-tight door for clearing out the ashes. $g$ is the heat-regenerative chamber, through which the heated gases pass to the air-outlet channel $h$, which is here shown as made of spiral form, and thence pass to the flue $j$.

The operation of the apparatus is as follows: The regenerative chamber is first heated to the required temperature, the heated gases passing off through the flue $j$ to the atmosphere. In passing through the flue $j$ the gases give up the greater portion of their heat to the ends of the thermocouples $a$. The upward passage of the gases through the flue $j$ causes a downward passage of cold air through the flue $c$, and this cold air coming in contact with the opposite ends of the thermocouples $a$ takes up heat therefrom and is thus warmed on its passage to the grate, which is thereby supplied with warmed fresh air. The regenerative chamber $g$ is used in order to maintain an even temperature, and to regulate the working of the apparatus the regenerative chamber is furnished with suitable valves by which it can be divided into sections, so that one or more sections can be used, according to the heat required.

Having fully described my invention, what I claim, and desire to secure by Letters Patent, is—

In a thermo-electric apparatus, the combination with a series of thermo-electric couples, an air-inlet arranged to conduct cold air between the proximate ends of the couples, and an air-outlet spirally surrounding the said ends of the couples and adapted to conduct heated gases, and a source of heat with which the air-inlet and air-outlet communicate.

BENJAMIN JAMES HALL.

Witnesses:
F. W. GOLDBY,
W. J. SKERTEN.